United States Patent
Yamamoto et al.

(10) Patent No.: US 7,662,079 B2
(45) Date of Patent: Feb. 16, 2010

(54) MOTORIZED ROLLER

(75) Inventors: Akira Yamamoto, Ohbu (JP);
Kazuyoshi Umeda, Ohbu (JP)

(73) Assignee: Sumitomo Heavy Industries, Ltd., Tokyo (JP)

( * ) Notice: Subject to any disclaimer, the term of this patent is extended or adjusted under 35 U.S.C. 154(b) by 1099 days.

(21) Appl. No.: 10/809,934

(22) Filed: Mar. 26, 2004

(65) Prior Publication Data
US 2005/0119098 A1    Jun. 2, 2005

(30) Foreign Application Priority Data
Mar. 27, 2003   (JP) ............... 2003-088519

(51) Int. Cl.
*B25F 5/02* (2006.01)
(52) U.S. Cl. .................. 492/47; 198/788
(58) Field of Classification Search .......... 492/60, 492/47; 198/788
See application file for complete search history.

(56) References Cited

U.S. PATENT DOCUMENTS

| | | | | |
|---|---|---|---|---|
| 2,736,209 A | * | 2/1956 | Christian ............... | 74/421 A |
| 4,082,180 A | * | 4/1978 | Chung ................. | 198/835 |
| 5,088,596 A | * | 2/1992 | Agnoff ................ | 198/788 |
| 5,732,813 A | * | 3/1998 | Nielsen et al. ......... | 198/788 |
| 6,443,295 B1 | * | 9/2002 | Hill .................. | 198/788 |
| 6,447,336 B1 | * | 9/2002 | Fannin et al. .......... | 439/587 |
| 6,672,449 B2 | * | 1/2004 | Nakamura et al. ........ | 198/788 |

FOREIGN PATENT DOCUMENTS

JP         11-127556         5/1999

\* cited by examiner

*Primary Examiner*—David P Bryant
*Assistant Examiner*—Sarang Afzali
(74) *Attorney, Agent, or Firm*—Squire, Sanders & Dempsey L.L.P.

(57) ABSTRACT

A motorized roller is provided, in which processing of the power transmission section thereof can be performed simply and with good productivity, and the processing precision can also be improved. The motorized roller includes a motor and a reducer which are disposed inside a roller body. Rotations of the motor are reduced by the reducer and transmitted to the roller body. In this motorized roller, a rotor connected to the roller body so as to transmit power of the reducer to the roller body is disposed inside the roller body, and the roller body is configured to be divided at a power transmission section thereof between the rotor and the roller body.

3 Claims, 6 Drawing Sheets

MOTORIZED ROLLER

BACKGROUND OF THE INVENTION

1. Field of the Invention

The present invention relates to a motorized roller such as a motor pulley or a motor roller used in a conveyor or the like, and more particularly to a motorized roller in which processing of the power transmission section thereof can be performed simply and with good productivity, and improved processing precision.

2. Description of the Related Art

Motorized rollers have been proposed in a variety of configurations. The proposed motorized roller is configured so that a motor and a reducer are disposed inside a roller body, and the rotations of the motor are reduced by the reducer and then transmitted to the roller body so that when secured to an external member the roller body is able to rotate. As shown in FIG. 5, this type of motorized roller can be used as a motor roller MR for moving a package 4 placed on top of a conveyor 2 through direct contact. Alternatively, as shown in FIG. 6, the motorized roller can also be used as a motor pulley MP for moving the package 4 via a belt 6.

As follows is a detailed description of a conventional motorized roller 10 (for example, see Japanese Patent Laid-Open Publication No. 1999-127556), based on FIG. 7. FIG. 7 shows a side sectional view of the motorized roller 10.

The motorized roller 10 comprises a roller body 12, a motor 30, and a reducer 40 as its main components.

The roller body 12 comprises a substantially circular cylindrical member, and the motor 30 and the reducer 40 are housed inside this roller body 12. Furthermore, bearings 18 and 19 are disposed at both end sections of the roller body 12, with roller covers 12a and 12b for closing these end sections disposed between the roller body and the bearings, and a pair of mounting shafts, namely a first mounting shaft 14 and a second mounting shaft 16, are retained so that they can relatively rotate with respect to the roller body 12 via the bearings 18 and 19. Accordingly, the roller body 12 can rotate about a central axis L1 of the first and second mounting shafts 14 and 16.

The first mounting shaft 14 is formed from a hollow rod-shaped member, and motor wiring 23 which is connected to the motor 30 at one end is inserted through this hollow section.

In contrast, the second mounting shaft 16 is formed from a solid rod-shaped member, and a spring casing 27 which is fixed to the roller cover 12b and provides sufficient space for housing a spring 26 is provided around the center of the roller body 12 side of the second mounting shaft 16. The spring 26 is accommodated inside this spring casing 27, and one end of the spring 26 contacts the end of the second mounting shaft 16. The other end of the spring 26 contacts a ball 29 that is held against the end of the casing 27. By employing this configuration, the compression and expansion of the spring 26 enables the second mounting shaft 16 to slide freely in and out along the central axis L1 of the roller body 12, in the direction H1 shown in the drawing.

The motor 30 is equipped with a motor shaft 32, and this motor shaft 32 also functions as the input shaft 41 for the reducer 40.

The reducer 40 is a so-called oscillating inner gearing planetary gear reducer, and comprises the input shaft 41 integrated with the motor shaft 32 of the motor 30, an eccentric body 42, an external gear 43, and an internal gear 44, and an output shaft 46 is connected to the external gear 43 via an oscillating shaft 45 that absorbs the eccentric oscillation component of the external gear 43. The output shaft 46 is also fixed to the roller body 12, thus enabling rotational driving of the roller body 12.

Next is a description of the actions of the motorized roller 10.

When the motor 30 is energized, the shaft 32 of the motor 30 rotates. The speed of this rotation of the motor shaft 32 (the input shaft 41 of the reducer 40) is reduced by the reducer 40, and the reduced output is transmitted to the roller body 12 via the output shaft 46, thereby achieving rotational driving of the roller body 12.

However, in the above roller body 12, both the end sections 12a and 12b are supported by a pair of the first mounting and second shafts 14 and 16, respectively, so as to relatively rotate, and the central region is supported by the output shaft 46 of the reducer 40 so as to integrally rotate therewith. Accordingly, in order to ensure smooth rotation of the roller body 12, each component must be processed and mounted to the roller body 12 so that the central axis of the output shaft 46, the central axis of the first mounting shaft 14, and the central axis of the second mounting shaft 16, which in combination represent the rotational axis for the roller body 12, are substantially aligned.

However, in this conventional motorized roller 10, the first and second mounting shafts 14 and 16 must be mounted to the end faces of the roller body 12, and the output shaft 46 of the reducer 40 must be attached inside the central region of the (substantially circular cylindrically shaped) roller body 12. This requires high precision processing, with the processing of the power transmission section (the section labeled Z in FIG. 7) between the roller body 12 and the output shaft 46 being particularly difficult. As a result of these processing precision difficulties, the productivity tends to fall.

In recent years, as the size of the packages being carried has increased, the demand for longer motorized rollers with greater axial length (longer roller bodies 12) has also increased, but the above processing problems are exacerbated as the length of the roller body 12 increases.

SUMMARY OF THE INVENTION

In order to solve the problems described above, it is an object of the present invention to provide a motorized roller in which processing of the power transmission section thereof can be performed simply and with good productivity, and improved processing precision.

The present invention resolves the problems described above by providing a motorized roller. The motorized roller includes a motor and a reducer which are disposed inside a roller body. Rotations of the motor are reduced by the reducer and transmitted to the roller body. In this motorized roller, a rotor connected to the roller body so as to transmit power of the reducer to the roller body is disposed inside the roller body, and the roller body is configured to be divided at a power transmission section thereof between the rotor and the roller body.

According to this aspect of the present invention, because the roller body can be divided at the power transmission section thereof between the rotor and the roller body, processing of the transmission section need not be conducted inside the roller body, but can be conducted at the end sections of the divided roller body. Accordingly, processing of the power transmission section, which has conventionally been very difficult, can be performed easily and with good precision, and an improvement in productivity is also possible.

In the present invention, there are no particular restrictions on the specific joint structure adopted to connect the divided roller body and the rotor.

For example, an inner peripheral surface of the roller body and an outer peripheral surface of the rotor may be connectable to each other, and the roller body may be divided at a point on the outer peripheral surface of the rotor. In this case, the roller body can be mounted to an end section of the divided roller body, so that the processing of the power transmission section can be completed simply and with good precision.

Furthermore, a ring shaped protrusion may be formed on the outer peripheral surface of the rotor, both axial side surfaces of this protrusion may be designed so as to contact respective end faces of divided sections of the roller body, and an outer peripheral surface of the protrusion may be formed so as to be flush with outer peripheral surfaces of the divided sections of the roller body that contact the protrusion. In this case, the protrusion can be used for positioning the rotor, enabling an even simpler and more precise mounting of the rotor.

DETAILED DESCRIPTION OF THE PREFERRED EMBODIMENTS

An embodiment of the present invention will now be described in detail hereinafter with reference to the drawings.

Figure 1:
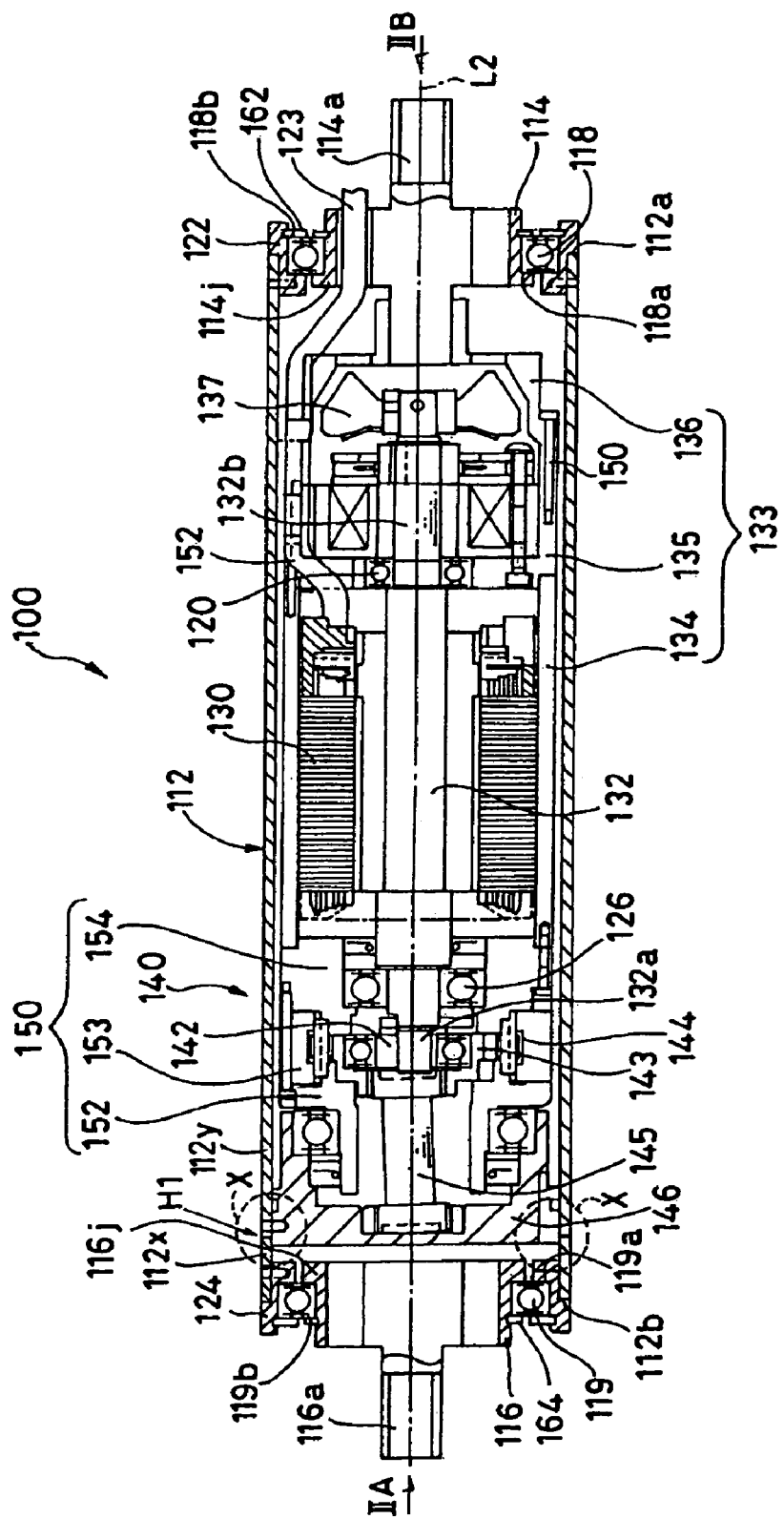
FIG. 1 is a side sectional view showing a motorized roller according to an embodiment of the present invention.
Figure 2:
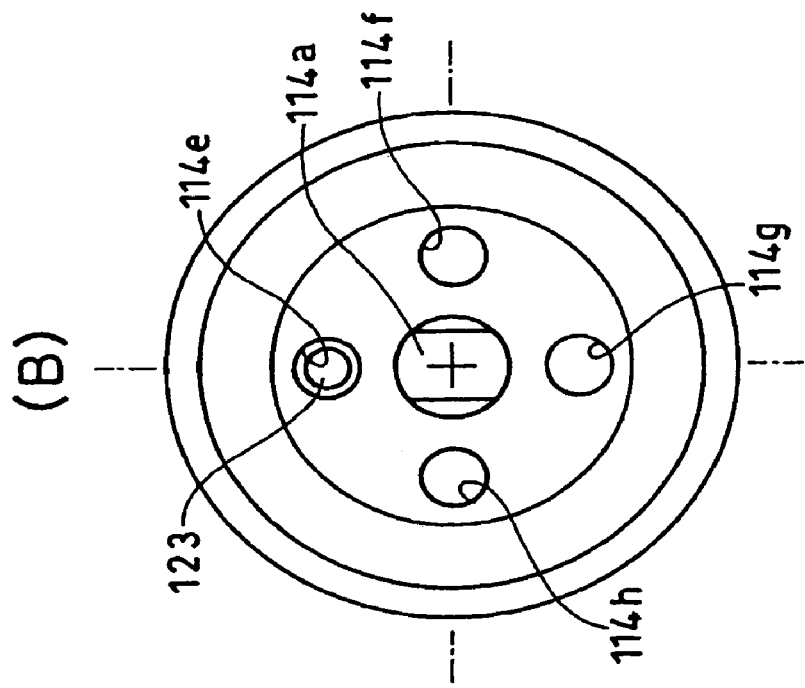
FIGS. 2(A) and 2(B) are side views shown along the arrow directions IIA and IIB in FIG. 1, respectively.
Figure 2:
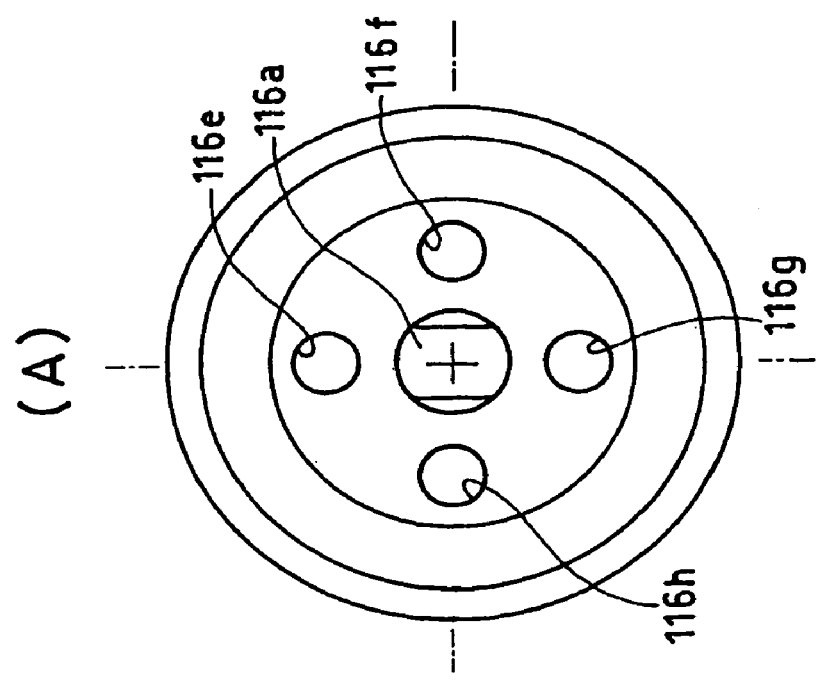
Figure 7:
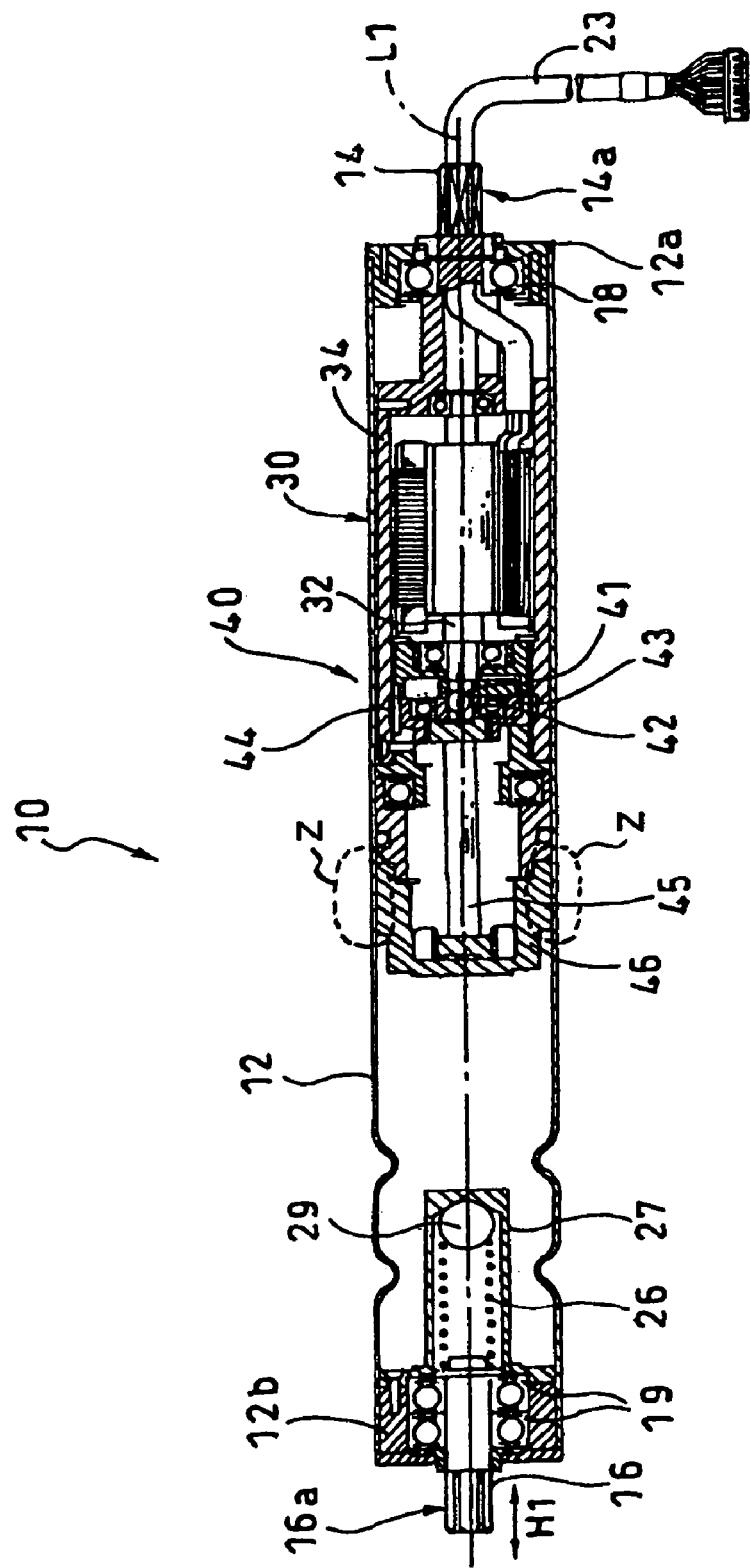
FIG. 7 is a side sectional view showing a conventional motorized roller.

FIG. 1 and FIGS. 2(A) and 2(B) are diagrams showing a motorized roller 100 according to the embodiment of the present invention, wherein FIG. 1 is a side sectional view of the motorized roller 100 which corresponds with the view of the conventional roller shown in FIG. 7, and FIGS. 2(A) and 2(B) are side views shown along the arrow directions IIA and IIB in FIG. 1, respectively.

This motorized roller 100 comprises a motor 130 and a reducer 140 disposed inside a roller body 112, and the rotations of the motor 130 are reduced by the reducer 140 and transmitted to the roller body 112.

The roller body 112 is a substantially circular cylindrical member, and the motor 130 and the reducer 140 are both housed inside this roller body 112. The roller body 112 comprises two components, namely, a first roller body 112x and a second roller body 112y (which will be described later). Furthermore, bearings 118 and 119 are disposed at both end sections 112a and 112b of the roller body 112, with ring shaped members 122 and 124 disposed therebetween, respectively. A pair of mounting brackets, namely a first mounting bracket 114 and a second mounting bracket 116, are retained so that they can relatively rotate with respect to the roller body 112 via the bearings 118 and 119. Accordingly, the roller body 112 can rotate about the central axis L2 of the first and second mounting brackets 114 and 116.

The first and second mounting brackets 114 and 116 also function as conventional roller covers for sealing both the end sections 112a and 112b of the roller body 112. As shown in FIGS. 2(A) and 2(B), the first mounting bracket 114 and the second mounting bracket 116 are each formed from a substantially circular plate shaped member, and can relatively rotate with respect to the roller body 112 about the central axis L2 shown in FIG. 1. Furthermore, mounting shafts 114a and 116a for fixing the first and second mounting brackets 114 and 116 to an external member such as a conveyor frame protrude from the brackets along the axis L2. Through holes 114e to 114h and 116e to 116h for enabling ventilation between the inside of the roller body 112 and the exterior are also formed in the mounting brackets 114 and 116, respectively.

Returning to FIG. 1, a frame body 114j is provided at one end of the first mounting bracket 114 (the end towards the center of the roller body 112), and this frame section 114j contacts an end face 118a of the bearing 118. Furthermore, a retaining ring 162 is engaged onto the other end of the frame body 114j, and contacts the opposite end face 118b of the bearing 118. In other words, the first mounting bracket 114 is restricted from moving along the axis L2 by the bearing 118.

On the other hand, a frame body 116j is provided at one end of the second mounting bracket 116 (the end towards the center of the roller body 112), and this frame section 116j contacts an end face 119a of the bearing 119. Furthermore, a retaining ring 164 is engaged onto the other end of the frame body 116j, and contacts the opposite end face 119b of the bearing 119. In other words, the second mounting bracket 116 is restricted from moving along the axis L2 by the bearing 119.

The motor 130 is an air cooled motor for general purpose. A casing 133 for the motor 130 is configured so that an end cover 136 which is integrated with the first mounting bracket 114, a fan cover 135, and a main casing 134 are connected together with bolts 150 and 152, and the end cover 136 is fixed to an external member not shown in the drawings in a non-rotatable manner, via the first mounting bracket 114. The various structural components of the motor 130 itself are housed inside the casing 133 (134, 135, 136). A motor shaft 132 that represents the output shaft of the motor 130 is supported at both ends by a pair of bearings 120 and 126 that are built into the casing 133. One end section 132a of the motor shaft 132 extends from the bearing 126 in an overhanging arrangement, and is used as the input shaft for the reducer 140. The other end of the motor shaft 132 is connected to a cooling fan 137, and this cooling fan 137 can be rotated by rotation of the motor shaft 132.

The reducer 140 is of basically the same construction as the reducer R2 used in the motorized roller MR2 described above as an example of the conventional technology. In other words, the reducer 140 is a so-called oscillating inner gearing planetary gear reducer comprising an input shaft (one end section of the motor shaft 132) 132a, an external gear 143, an internal gear 144, and an oscillating shaft 145. The external gear 143 is incorporated into the outer periphery of the input shaft 132a via an eccentric body 142 and is able to undergo eccentric oscillating rotation relative to the input shaft 132a. The internal gear 144 that engages on the inside with the external gear 143. The oscillating shaft 145 is connected to the external gear 143 so that it can absorb the eccentric oscillation component of that external gear 143. The entire reducer 140 is housed and supported inside a casing 150. Furthermore, the oscillating shaft 145 can transmit power to the roller body 112 via a circular plate shaped base rotor 146, thereby enabling rotational driving of the roller body 112.

Figure 3:
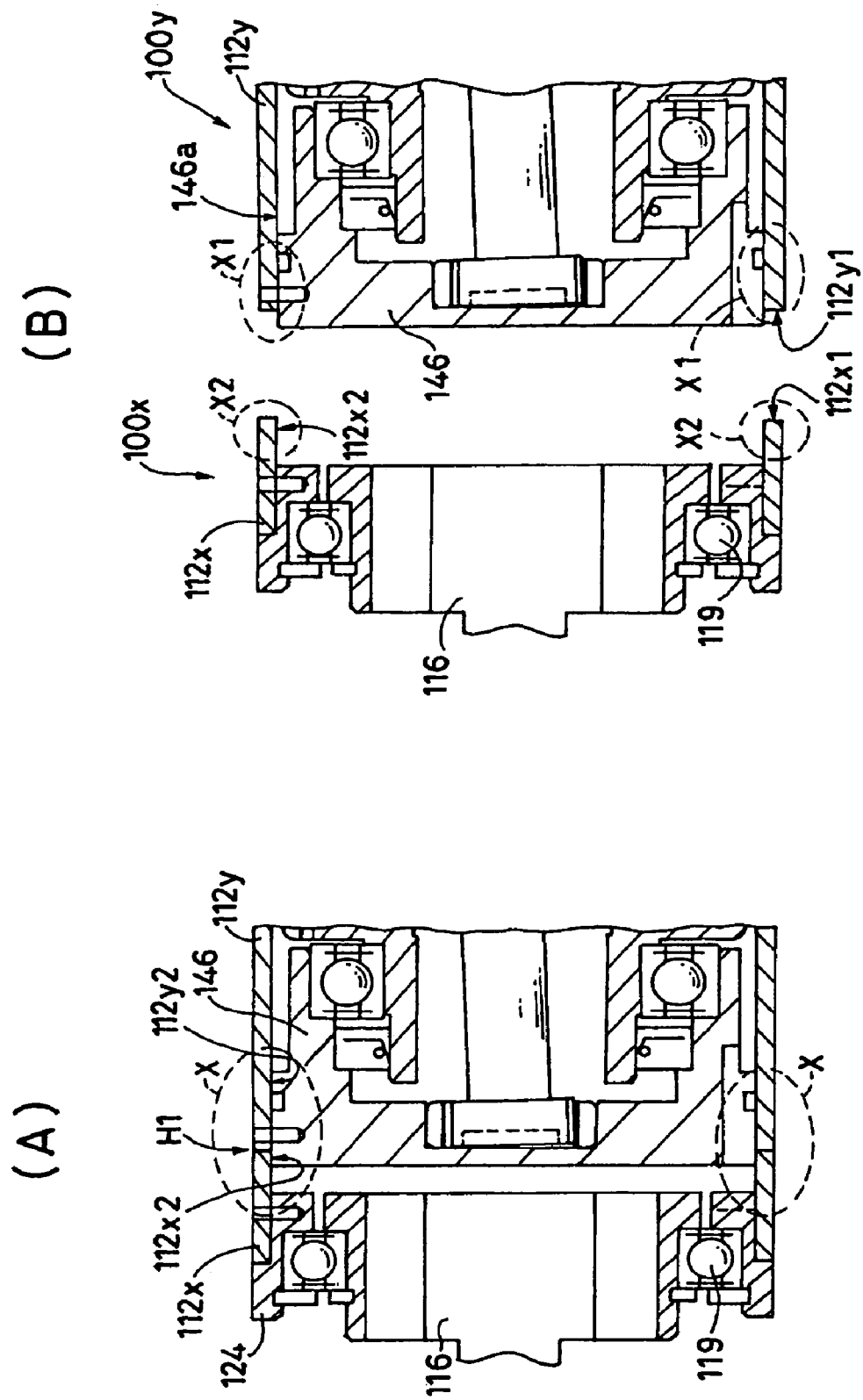
FIGS. 3(A) and 3(B) are a partially enlarged view and an exploded view of the vicinity surrounding the power transmission section X from FIG. 1.

FIGS. 3(A) and 3(B) show a partially enlarged view of the vicinity surrounding the power transmission section X from FIG. 1, and an exploded view of the same vicinity, respectively.

As shown in FIGS. 3(A) and 3(B), the roller body 112 comprises two components, namely a first roller body 112x (on the left side in the drawing), and a second roller body 112y (on the right side in the drawing), and these two components can be divided at a position (H1 in the drawing) outside an outer peripheral surface 146a of the base rotor 146.

The first roller body 112x is fixed to a ring shaped member 124 by bolts not shown in the drawing, and an inner peripheral end surface 112x2 of this roller body is connected with the outer peripheral surface 146a of the base rotor 146. On the other hand, the second roller body 112y is fixed to the base rotor 146 by bolts not shown in the drawing, and an inner peripheral end surface 112y2 of this roller body is also connected with the outer peripheral surface 146a of the base rotor 146. In other words, the inner peripheral end surfaces 112x2 and 112y2 of the first and second roller bodies 112x and 112y are both connected with the inner peripheral surface 146a of the base rotor 146, thereby forming the power transmission section X for transmitting power from the base rotor 146 to the roller.

As shown in FIG. 3(B), by dividing the roller body 112 into two components, the motorized roller 100 can be divided into a first roller 100x comprising a second mounting bracket 116, and a second roller 100y comprising a first mounting bracket 114 and the base rotor 146 at opposing ends. The divided first and second rollers 100x and 100y can be easily joined by welding together an end section 112x1 of the first roller body 112x and an end section 112y1 of the second roller body 112y.

Next is a description of the actions of the motorized roller 100 according to the embodiment of the present invention described above.

When the motor shaft 132 (which is the input shaft 132a) of the motor 130 undergoes one rotation, the external gear 143 undergoes a single eccentric oscillation about the input shaft 132a via the eccentric body 142. This eccentric oscillation causes a sequential displacement in the (internal contact) engagement position between the internal gear 144 and the external gear 143 so that the engagement position makes a single rotation. Because the number of teeth of the external gear 143 is less than the number of teeth of the internal gear 144 by a value of N (1 in this example), the external gear 143 undergoes a phase displacement relative to the internal gear 144 by an amount equivalent to this difference N in the number of teeth. However in this embodiment, the external gear 143 is connected to the base rotor 146 via the oscillating shaft 145. As a result, the oscillation component of the external gear 143 is absorbed by the oscillating shaft 145, and only the rotation component caused by the above phase difference is transmitted to the base rotor 146 as a speed reduced rotation, and this reduced rotation is then transmitted to the roller body 112.

According to the motorized roller 100 of this embodiment of the present invention, because the roller body 112 can be divided into the first and second roller bodies 112x and 112y at the power transmission section X between the base rotor 146 and the roller body 112, processing of the power transmission section X need not be conducted inside the roller body 112, but can be conducted at the inner peripheral end surfaces 112x2 and 112y2 of the first and second roller bodies 112x and 112y. Accordingly, processing of the power transmission section, which has conventionally been very difficult, can be performed easily and with good precision, and an improvement in productivity is also possible.

Specifically, because the base rotor 146 can be mounted to the inner peripheral end surface 112y2 of the second roller body 112y as shown in FIG. 3(B), processing of the power transmission section X1 between the base rotor 146 and the second roller body 112y is simple, and as a result, alignment of the central axis of the first mounting bracket 114 and the central axis of the base rotor 146, which in combination represent the rotational axis for the roller body 112, can be performed easily and with good precision. Similarly, processing of the power transmission section X2 between the first roller body 112x and the base rotor 146 is conducted at the inner peripheral end surface 112x2 of the first roller body 112x, so that the same effects can be achieved.

Figure 4:
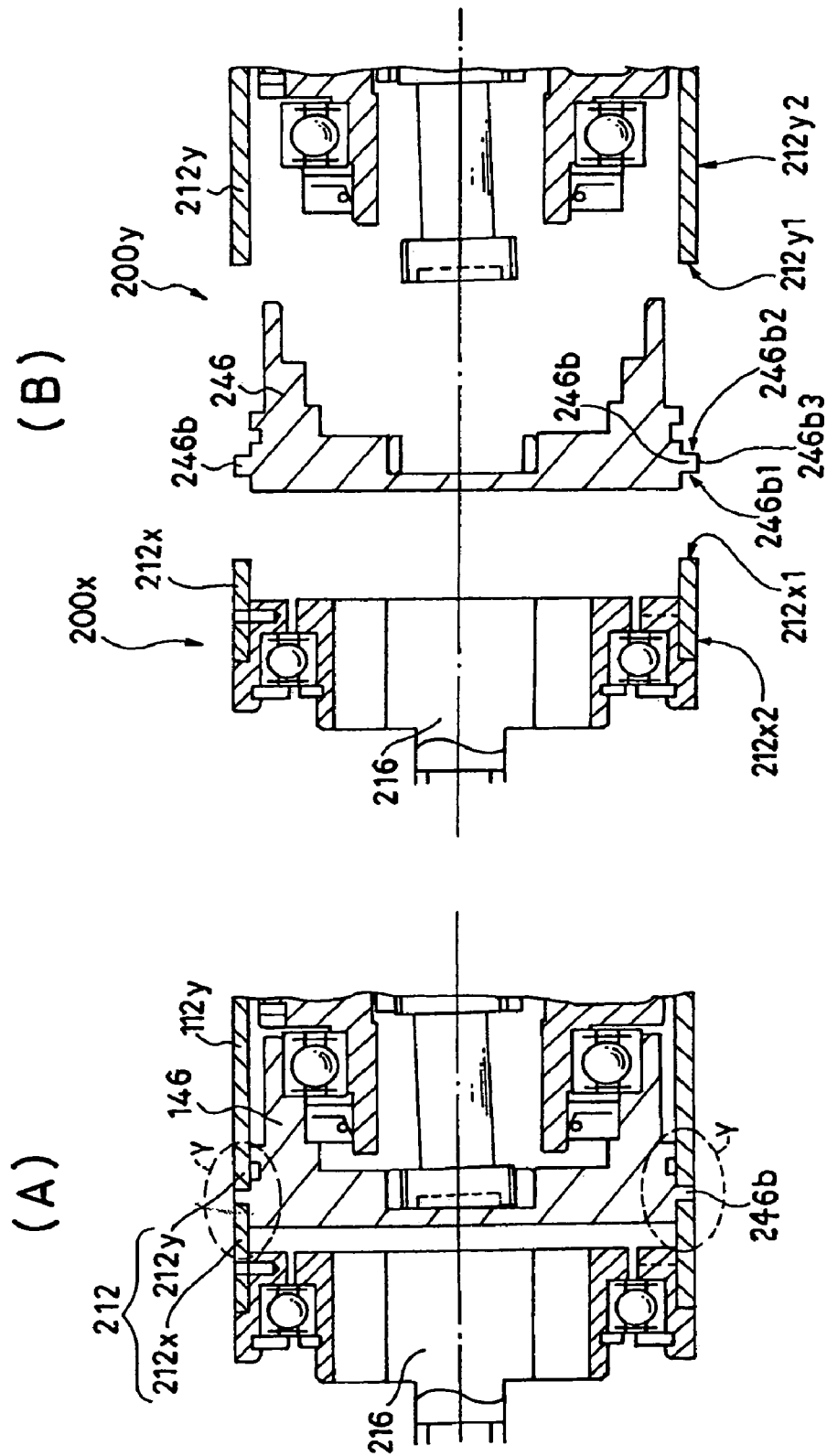
FIGS. 4(A) and 4(B) are a partially enlarged view and an exploded view of the vicinity surrounding the power transmission section Y of a motorized roller according to a second embodiment of the present invention.
Figure 5:
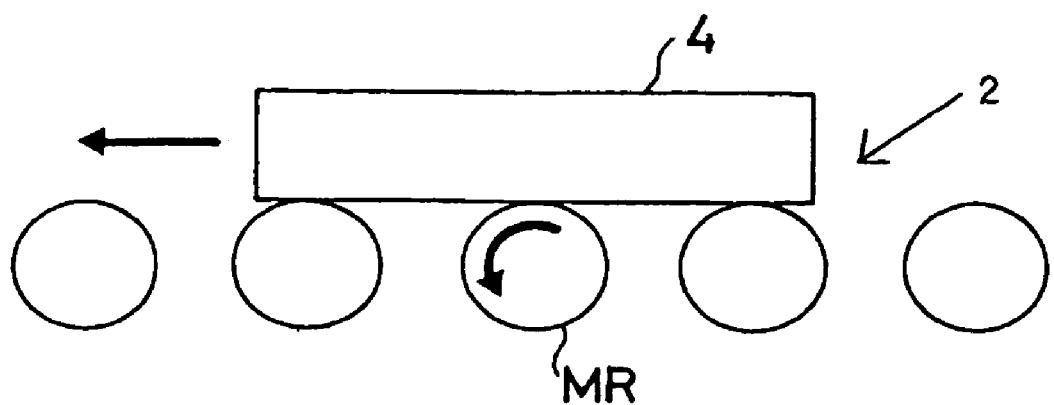
FIG. 5 is a schematic front view showing an example of a motorized roller applied to a motor roller system.
Figure 6:
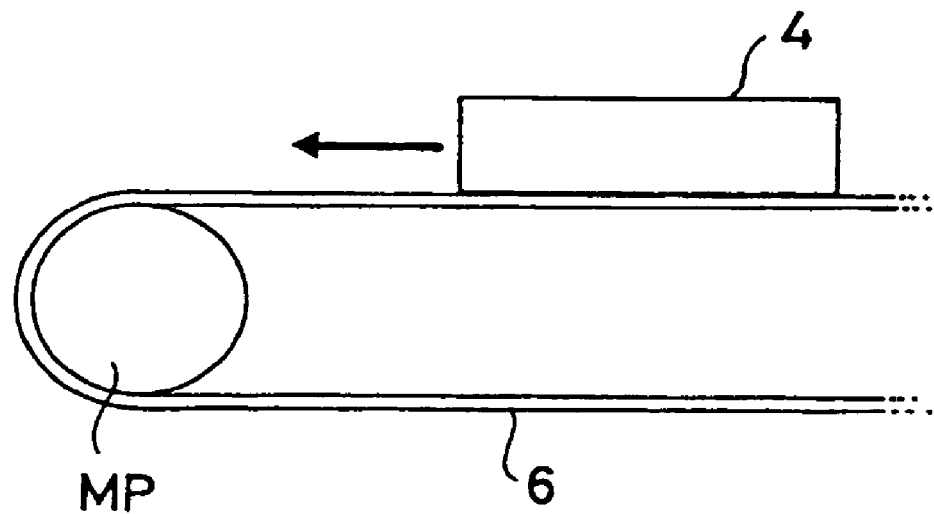
FIG. 6 is a schematic front view showing an example of a motorized roller applied to a motor pulley system.

Next is a description of a motorized roller 200 according to a second embodiment of the present invention, based on FIGS. 4(A) and 4(B). With the exception of the structures of the roller body 212 and the base rotor 246, this motorized roller 200 is of the same construction as the motorized roller 100 shown in FIG. 1, and consequently FIGS. 4(A) and 4(B) show only the vicinity surrounding the power transmission section Y of the motorized roller 200, with FIG. 4(A) showing a partially enlarged view of the power transmission section Y, and FIG. 4(B) showing a corresponding exploded view.

The roller body 212 can be divided into components, namely a first roller body 212x and a second roller body 212y at a position on the outer peripheral surface 246a of the base rotor 246. Accordingly, by dividing the roller body 212 into these two roller body components 212x and 212y, the motorized roller 200 can be divided into a first roller 200x comprising a second mounting bracket 216, and a second roller 200y comprising a first mounting bracket (which is not shown in the drawings) and the base rotor 246 at opposing ends.

Furthermore, a ring shaped protrusion 246b is formed in the central section in an axial direction of the outer peripheral surface 246a of the base rotor 246. Both the axial side surfaces 246b1 and 246b2 of this protrusion 246b can be brought into contact with the respective end sections 212x1 and 212y1 of the first and second roller bodies 212x and 212y. The outer peripheral surface 246b3 of the protrusion 246b sits flush with the outer peripheral surfaces 212x2 and 212y2 of the first and second roller bodies 212x and 212y that contact the protrusion 246b.

The divided first and second rollers 200x and 200y can be easily joined together by welding the end section 212x1 of the first roller body 212x to the protrusion 246b of the base rotor 246, and welding the end section 212y1 of the second roller body 212y to the other side of the protrusion 246b of the base rotor 246.

According to the motorized roller 200 of this second embodiment of the present invention, the protrusion 246b formed on the outer periphery 246a of the base rotor 246 enables the base rotor 246 to be easily positioned relative to the first and second roller bodies 212x and 212y, so that mounting of the base rotor 246 can be completed easily and with good precision.

In the embodiments described above, an oscillating gearing planetary gear reducer was employed as the reducer 140, but the present invention is not restricted to this configuration.

Furthermore, the divided structure of the roller body is not restricted to the configurations shown in the drawings, and any configuration in which the roller body can be divided at the power transmission section between the rotor and the roller body may be adopted.

According to the present invention, a motorized roller is provided in which processing of the power transmission section can be performed simply and with good productivity, and the processing precision can also be improved.

The disclosure of Japanese Paten Application No. 2003-88519 filed Mar. 27, 2003 including specification, drawings and claims is incorporated herein by reference in its entirety.

What is claimed is:

1. A motorized roller comprising:
   a roller body of the motorized roller;
   a motor disposed inside the roller body;
   a reducer which is disposed inside the roller body, and reduces the rotation of the motor; and
   a rotor which is disposed inside the roller body, and connected with the reducer and the roller body to transmit power of the reducer to the roller body, wherein
   the roller body comprises a first roller body and a second roller body, and
   an axial end section of a second roller body side of the first roller body and an axial end section of a first roller body side of the second roller body are connected at a power transmission section between the rotor and the roller body.

2. The motorized roller according to claim 1, wherein inner peripheral surfaces of the first roller body and the second roller body are connected to an outer peripheral surface of the rotor.

3. The motorized roller according to claim 2, wherein a ring shaped protrusion is formed on the outer peripheral surface of the rotor,
   both axial side surfaces of the protrusion are designed so as to contact respective inner end faces of the first roller body and the second roller body, and
   an outer peripheral surface of the protrusion is formed so as to be flush with outer peripheral surfaces of the first roller body and the second roller body.

* * * * *